(12) United States Patent
Ochiai et al.

(10) Patent No.: US 7,121,579 B2
(45) Date of Patent: Oct. 17, 2006

(54) OCCUPANT RESTRAINT SYSTEM

(75) Inventors: Fumiharu Ochiai, Saitama (JP); Takashi Aoki, Saitama (JP); Hidetoshi Utsumi, Saitama (JP); Naohiko Saita, Saitama (JP); Yuichi Saito, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/167,299

(22) Filed: Jun. 11, 2002

(65) Prior Publication Data

US 2003/0001365 A1  Jan. 2, 2003

(30) Foreign Application Priority Data

Jun. 11, 2001 (JP) ............................. 2001-175064
Feb. 13, 2002 (JP) ............................. 2002-035711

(51) Int. Cl.
*B60R 21/22* (2006.01)
*B60R 21/24* (2006.01)

(52) U.S. Cl. ................................ 280/730.2; 280/728.2

(58) Field of Classification Search ............. 280/730.2, 280/730.1, 733, 735, 801.1, 807, 808
See application file for complete search history.

(56) References Cited

U.S. PATENT DOCUMENTS

| | | | | |
|---|---|---|---|---|
| 5,074,583 A | * | 12/1991 | Fujita et al. ............. | 280/730.1 |
| 5,393,091 A | * | 2/1995 | Tanaka et al. .............. | 280/733 |
| 5,461,567 A | * | 10/1995 | Kelley et al. ................. | 701/45 |
| 5,615,917 A | * | 4/1997 | Bauer ......................... | 280/806 |
| 5,718,451 A | * | 2/1998 | White ......................... | 280/735 |
| 5,785,347 A | * | 7/1998 | Adolph et al. .............. | 280/735 |
| 6,189,923 B1 | * | 2/2001 | Tsubone ..................... | 280/735 |
| 6,213,512 B1 | * | 4/2001 | Swann et al. ............... | 280/806 |
| 6,254,123 B1 | * | 7/2001 | Urushi et al. ............ | 280/730.2 |

FOREIGN PATENT DOCUMENTS

| | | |
|---|---|---|
| DE | 195 26 619 A 1 | 1/1997 |
| DE | 197 36 200 A 1 | 2/1999 |
| DE | 197 42 768 A 1 | 4/1999 |
| DE | 199 54 034 A 1 | 5/2001 |
| EP | 0903269 B1 * | 3/1999 |
| JP | 10-297423 | 11/1998 |

(Continued)

*Primary Examiner*—Son T. Nguyen
(74) *Attorney, Agent, or Firm*—Carrier, Blackman & Associates, P.C.; Joseph P. Carrier; William D. Blackman

(57) ABSTRACT

A vehicular occupant restraint system includes an airbag, an inflator, and a seat belt system including a shoulder belt and a pre-tensioner. The airbag is disposed in a folded state along an upper edge of a door opening of a vehicle body. When the vehicle is involved in a side collision, the airbag is inflated by a gas generated by the inflator so that it is deployed into a curtain shape along an inner face of a side of an occupant compartment. Unlike conventional pre-tensioner systems that only tension a seatbelt when the vehicle is involved in a front collision, the pre-tensioner of the present invention also applies a tension to the shoulder belt of the seat belt system when the vehicle is involved in a side collision. Since a tension is applied to the shoulder belt by operation of the pre-tensioner that normally operates only when the vehicle is involved in a front collision, it is possible to maintain a correct positional relationship between the shoulder belt and an occupant even in the case where there is interference between the shoulder belt and the airbag that is deploying downward from above along the inner face of the side of the occupant compartment.

17 Claims, 14 Drawing Sheets

FOREIGN PATENT DOCUMENTS

| | | | |
|---|---|---|---|
| JP | 10329634 | * | 12/1998 |
| JP | 11-235965 | | 8/1999 |
| JP | 11-321544 | | 11/1999 |
| JP | 411321552 A | * | 11/1999 |
| JP | 2000-033847 | | 2/2000 |
| JP | 2001163183 A | * | 6/2001 |
| JP | 2001219807 A | * | 8/2001 |
| JP | 2002316611 A | * | 10/2002 |
| KR | 2002055667 A | * | 7/2002 |

* cited by examiner

OCCUPANT RESTRAINT SYSTEM

BACKGROUND OF THE INVENTION

1. Technical Field of the Invention

The present invention relates to an occupant restraint system in which a side airbag is disposed in a folded state along an upper edge of a door opening of a vehicle body, the airbag is inflatable by a gas, generated by an inflator, when the vehicle is involved in a side collision. Upon inflation, the airbag is deployed into a curtain shape along the inner face of a side of an occupant compartment. When the vehicle is involved in either a front collision or a side collision, a pre-tensioner applies a tension to a shoulder belt of a seat belt system for restraining an occupant in a seat.

2. Description of the Related Art

An occupant restraint system in which an airbag is deployed into a curtain shape along the inner face of a side of an occupant compartment when the vehicle is involved in a side collision is known in, for example, Japanese Patent Application Laid-open Nos. 2000-33847 and 11-235965. With regard to a seat belt system, there is known art in which a shoulder belt can normally be drawn from a retractor so that the body of an occupant is not restrained from moving and, when the vehicle is involved in a front collision, a pre-tensioner provided in the retractor draws in the shoulder belt so as to apply a tension thereto, thereby reliably restraining the occupant in a seat.

However, since the pre-tensioner of the known seat belt system does not operate when the vehicle is involved in a side collision, if the airbag deploys downward along the inner face of a side of the occupant compartment in this state, depending on the positional relationship between a seat belt anchor and the occupant, there is a case where the lower edge of the air bag might interfere with the shoulder belt of the seat belt system, and there is a possibility that the shoulder belt might be displaced.

The present invention has been achieved in view of the above-mentioned circumstances, and it is an object of the present invention to maintain a correct positional relationship between the occupant and the shoulder belt of the seat belt system when the side air bag deploys downward along the inner face of a side of the occupant compartment.

SUMMARY OF THE INVENTION

In order to achieve the above-mentioned object, a first aspect of the present invention proposes an occupant restraint system for a vehicle that includes an airbag disposed in a folded state along an upper edge of a door opening of a vehicle body; an inflator that generates a gas when the vehicle is involved in a collision to inflate the airbag so that it is deployed in a curtain shape along the inner face of a side of an occupant compartment; and a seat belt system for restraining an occupant seated in a seat, the seat belt system including a shoulder belt and a pre-tensioner which applies a tension to the shoulder belt when the vehicle is involved in a front collision, wherein, prior to the airbag deploying into the occupant compartment when the vehicle is involved in a side collision, the pre-tensioner applies a tension to the shoulder belt of the seat belt system.

In accordance with the above-mentioned system arrangement, when the vehicle is involved in a side collision, a tension is applied to the shoulder belt by operation of the pre-tensioner, unlike conventional pre-tensioner systems which operate only when the vehicle is involved in a front collision. It is, therefore, possible to maintain a correct positional relationship between the shoulder belt and the occupant even in the case where there is interference between the shoulder belt and the airbag that is deploying downward from above along the inner face of the side of the occupant compartment.

The seat of the present invention corresponds, for example, to a front seat 74 of the embodiment below.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 1 is a perspective view showing an interior of the occupant compartment of an automobile.

FIG. 2 is a view corresponding to FIG. 1, showing a state in which an airbag of an occupant restraint system has been deployed.

FIG. 3 is an enlarged view of the occupant restraint system in which the airbag has been deployed.

FIG. 4 is an exploded perspective view of the occupant restraint system.

FIG. 5 is an enlarged cross section along line 5—5 in FIG. 1.

FIG. 6 is an enlarged cross section along line 6—6 in FIG. 1.

FIG. 7 is an enlarged cross section along line 7—7 in FIG. 1.

FIG. 8 is an enlarged cross section along line 8—8 in FIG. 1.

FIG. 9 is an enlarged cross section along line 9—9 in FIG. 3.

FIG. 10 is an enlarged cross section along line 10—10 in FIG. 5.

FIG. 11 is a view taken in a direction of arrow 11 in FIG. 4.

FIG. 12 is a view taken in a direction of arrow 12 in FIG. 7.

FIG. 13 is an enlarged view of the vicinity of a rear part of the deployed airbag.

FIG. 14 is a front view of an occupant seated in a front seat.

DESCRIPTION OF THE PREFERRED EMBODIMENT

Figure 1:
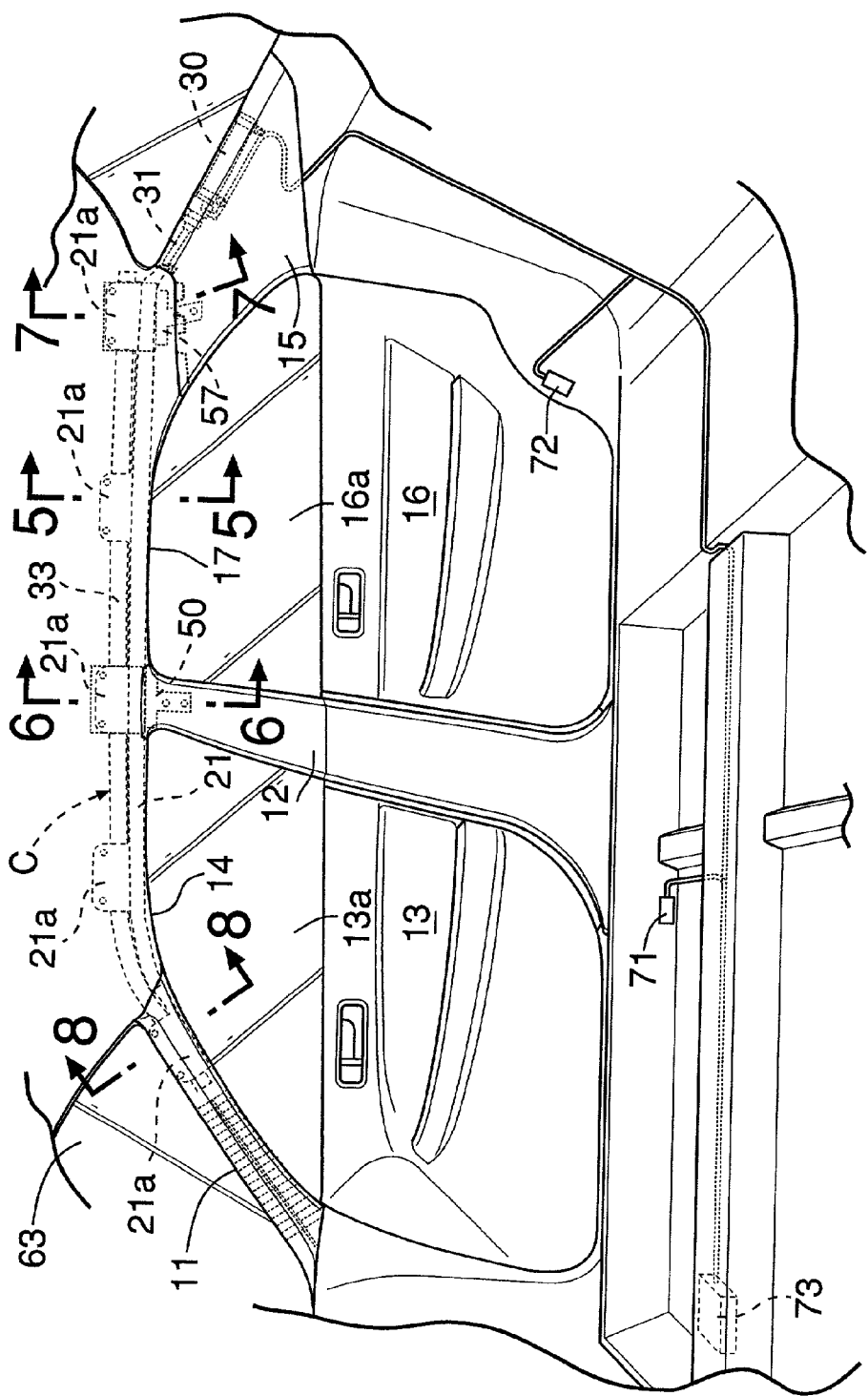
FIGS. 1 to 14 show an embodiment of the present invention.

Referring to FIG. 1, a door opening 14 for receiving a front door 13 is formed between a front pillar 11 and a center pillar 12 on a vehicle body side face, and a door opening 17 for receiving a rear door 16 is formed between the center pillar 12 and a rear pillar 15. A roof side rail 18 (see FIG. 5) extends in the longitudinal direction of the vehicle body so as to provide a connection between the upper end of the front pillar 11 and the upper end of the rear pillar 15, the roof side rail 18 defining the upper edges of the door openings 14 and 17 of the front door 13 and the rear door 16. An occupant restraint system C is provided along the roof side rail 18. The occupant restraint system C is provided on each of the left and right sides of the vehicle body. The occupant restraint systems C on the respective left and right sides of the vehicle have a substantially identical mirror-image structure. Therefore a description of the structure on one side of the vehicle body will suffice to explain the invention, and that provided on the right side of the vehicle body is described below as representative thereof.

Figure 2:
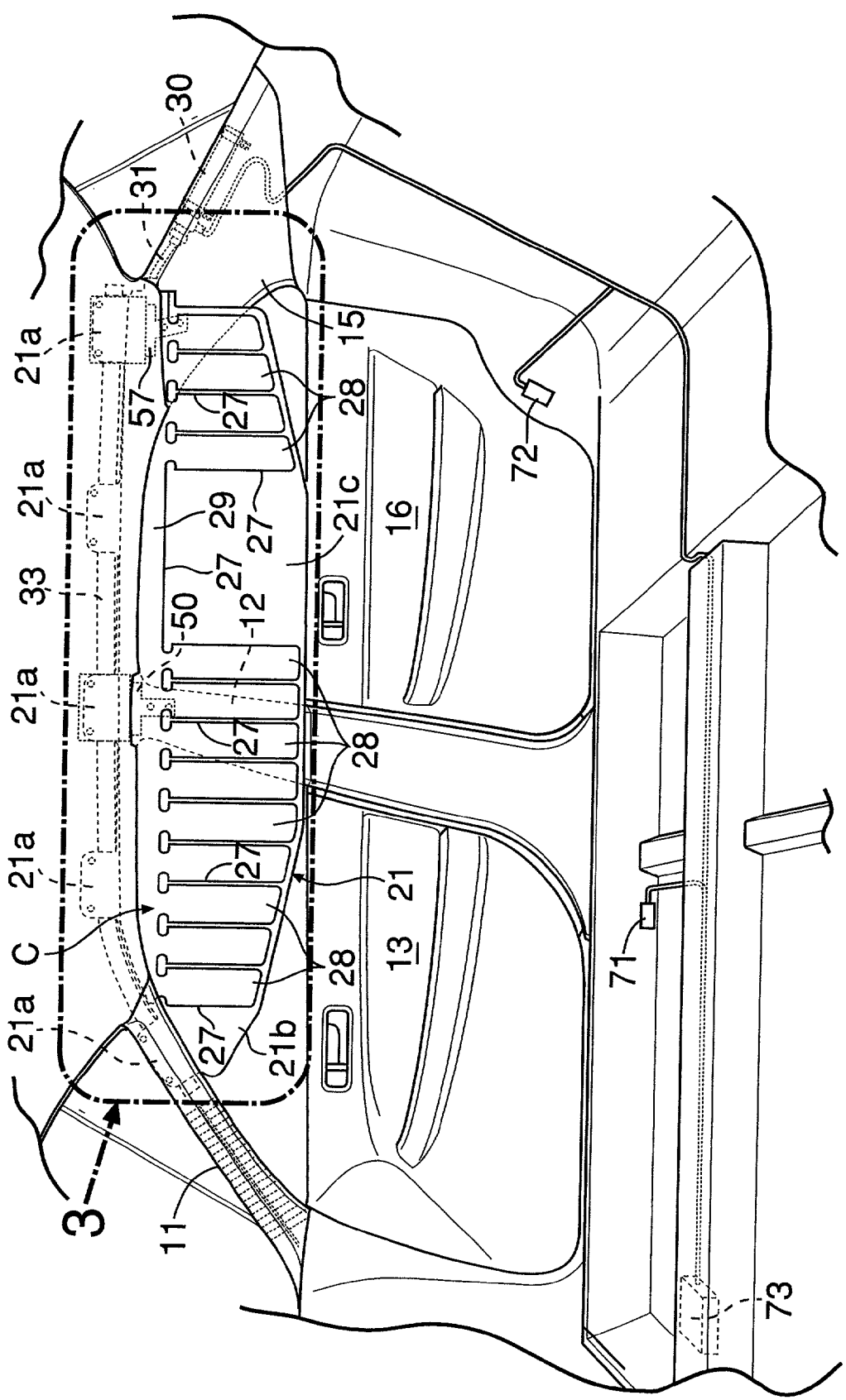

Referring to FIG. 2, when the vehicle is involved in a side collision or a rollover, if an acceleration equal to or greater than a predetermined value is detected, an airbag 21 of the occupant restraint system C is deployed downward into a curtain shape from the upper edges of the door openings 14 and 17 so as to block occupants seated in front and rear seats from impacting against the inner side face of the vehicle body, that is, the front pillar 11, the center pillar 12, the rear pillar 15, a window pane 13a of the front door 13, and a window pane 16a of the rear door 16.

Figure 3:
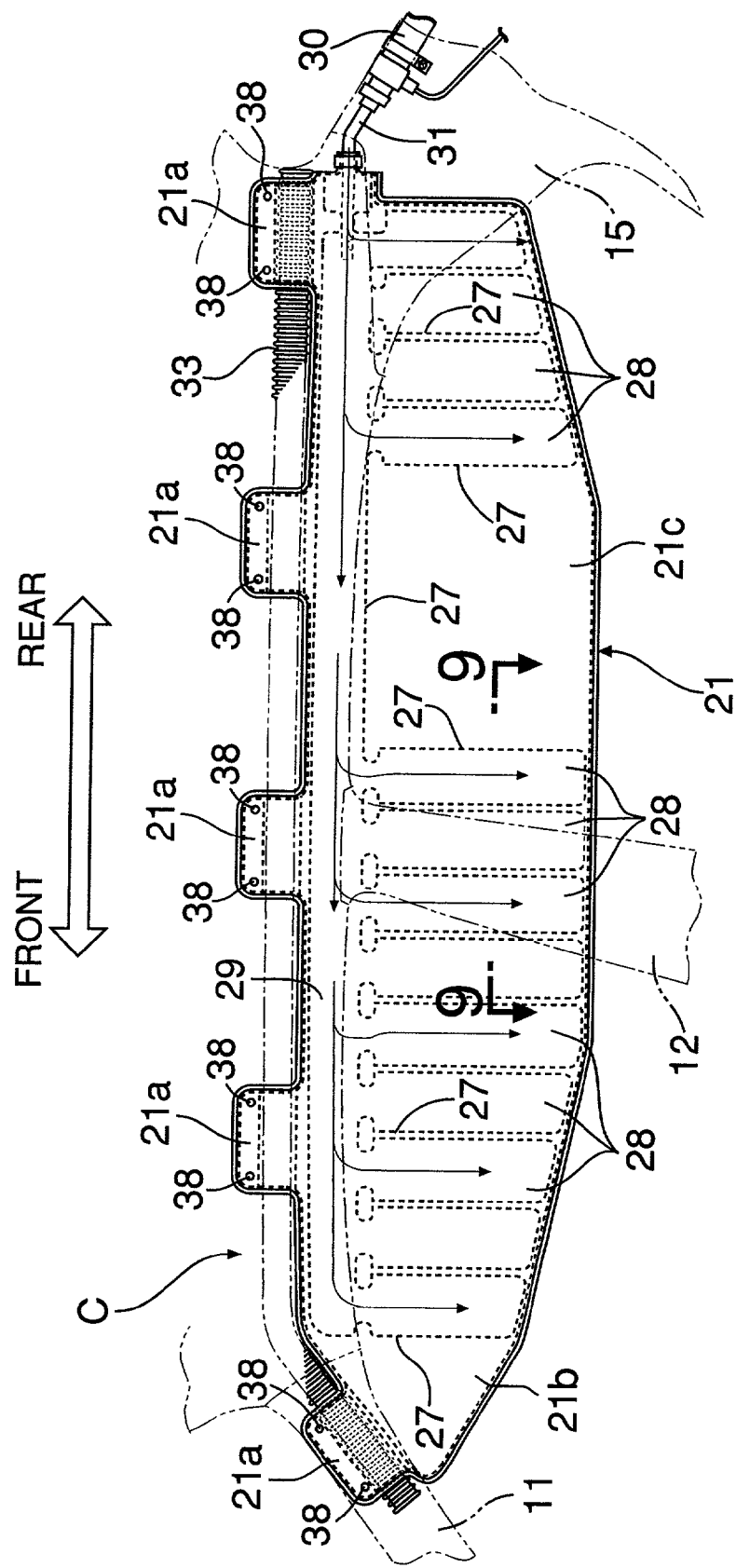
Figure 9:
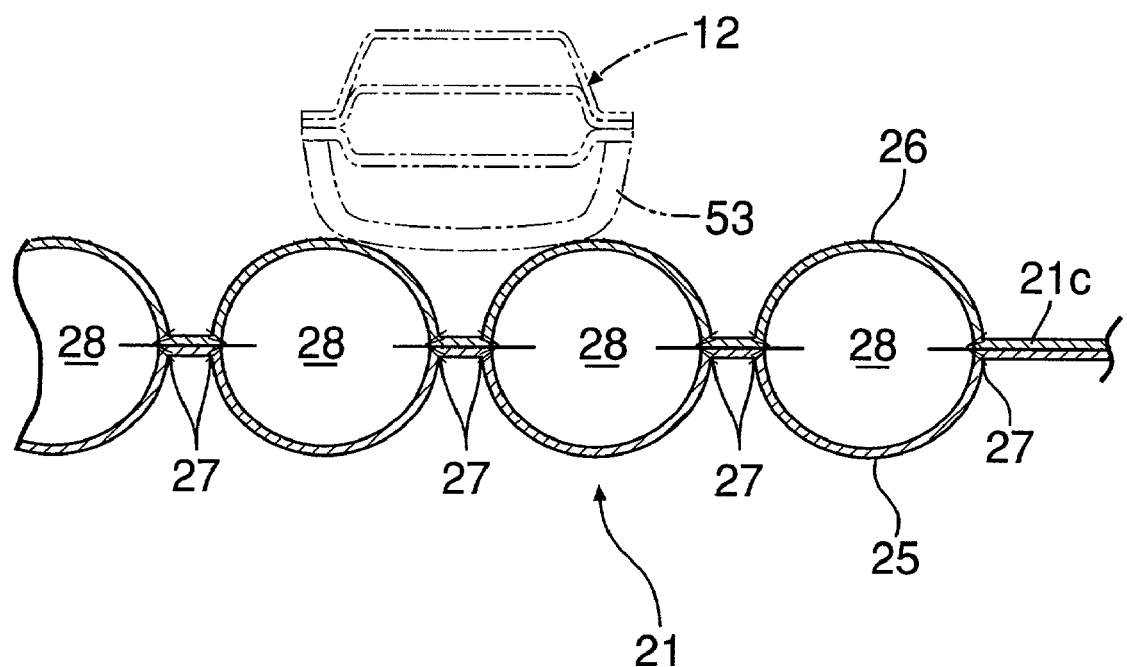

As shown in FIG. 3, the airbag 21 extending in the longitudinal direction of the vehicle body is formed by sewing with stitching 27 a first base fabric 25 and a second base fabric 26 superimposed one on top of the other, the two fabrics having substantially the same shape (see FIG. 9). The stitching 27 forms a plurality of (for example, thirteen) cells 28 and an upper communicating passage 29. The front end of a gas supply pipe 31 extending forward from an inflator 30 housed within the rear pillar 15 is inserted into the upper communicating passage 29. The lower ends of the thirteen cells 28 branching downward from the upper communicating passage 29 are closed. The portion of the gas supply pipe 31 which is inserted into the upper communicating passage 29, is tightened by means of a metal band 22 (see FIG. 13).

Positions of the airbag 21 that correspond to the rear side of the front pillar 11 and the rear side of the center pillar 12 are provided with non-inflatable sections 21b and 21c where no cells 28 are formed.

Figure 13:
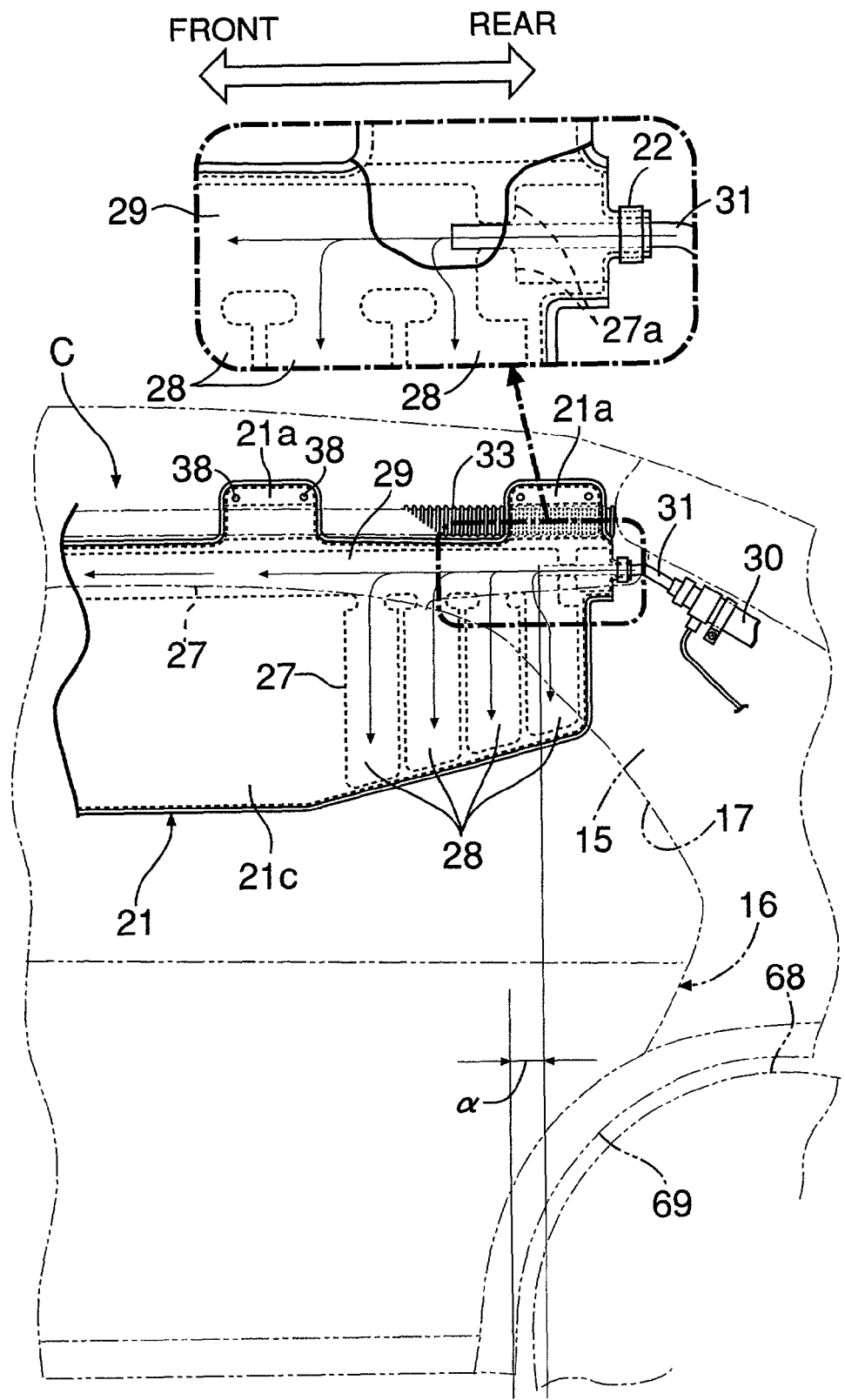

As shown in FIG. 13 in a magnified manner, since the diameter of the gas supply pipe 31 extending forward from the inflator 30 is smaller than the diameter of the upper communicating passage 29 of the airbag 21, the gas supply pipe 31 is positioned by means of pipe supports 27a formed from parts of the stitching 27 defining the upper communicating passage 29 so that the opening at the tip end of the gas supply pipe 31 is positioned at the center of the upper communicating passage 29. In this way, simply modifying parts of the stitching 27 of the airbag 21 can position the gas supply pipe 31 relative to the upper communicating passage 29, thus eliminating special parts for the positioning to contribute to a reduction in cost.

Figure 10:
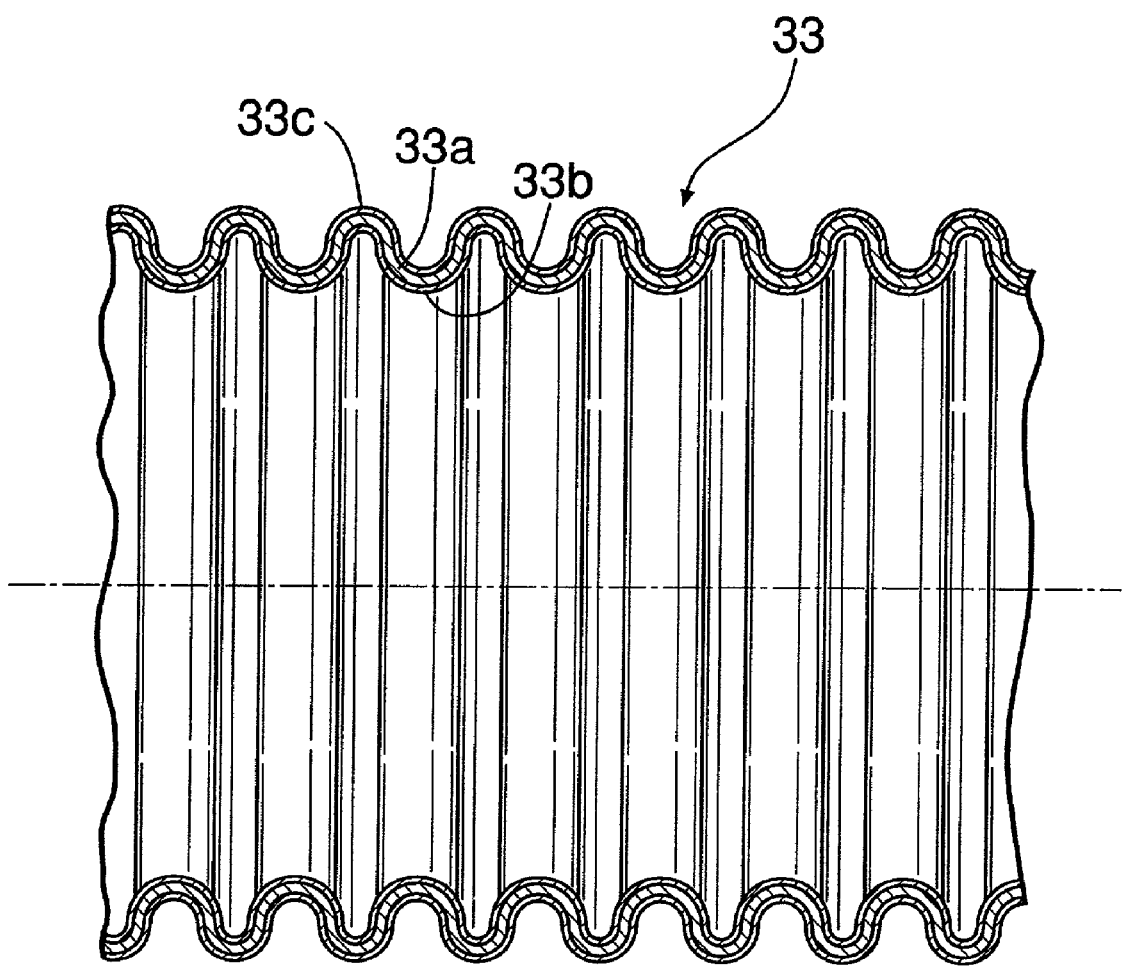

Provided along the upper edge of the airbag 21 are a plurality of (for example, five) impact absorbing member supports 21a. An impact absorbing member 33, which is a corrugated pipe, is integrated with the airbag 21 by means of the impact absorbing member supports 21a. As shown in FIG. 10, the impact absorbing member 33 is formed into a bellows having a circular cross section by laminating a main body 33a made of aluminum and inner and outer coverings 33b and 33c made of paper. The impact absorbing member 33 collapses by an external load to exhibit an effective impact-absorbing effect. A roof 34 is formed from an outer member 35, a center member 36, and an inner member 37. The upper ends of the four impact absorbing member supports 21a on the rear side of the airbag 21 are each fixed to the inner member 37 by means of two bolts 38 (see FIGS. 5 to 7). The front pillar 11 is formed from an outer member 39, a center member 40, and an inner member 41. The upper end of the impact absorbing member support 21a on the front end of the airbag 21 is fixed to the inner member 41 by means of two bolts 38 (see FIG. 8).

Since the folded airbag 21 and the impact absorbing member 33 are integrated in advance to form a module in this way, the mounting operation therefor becomes easy in comparison with a case where they are individually mounted in the vehicle body, thereby enhancing the operational efficiency and the precision of assembly. Moreover, since both the folded airbag 21 and the corrugated pipe impact absorbing member 33 are flexible, they can be placed easily along the curved roof side rail 18.

Figure 4:
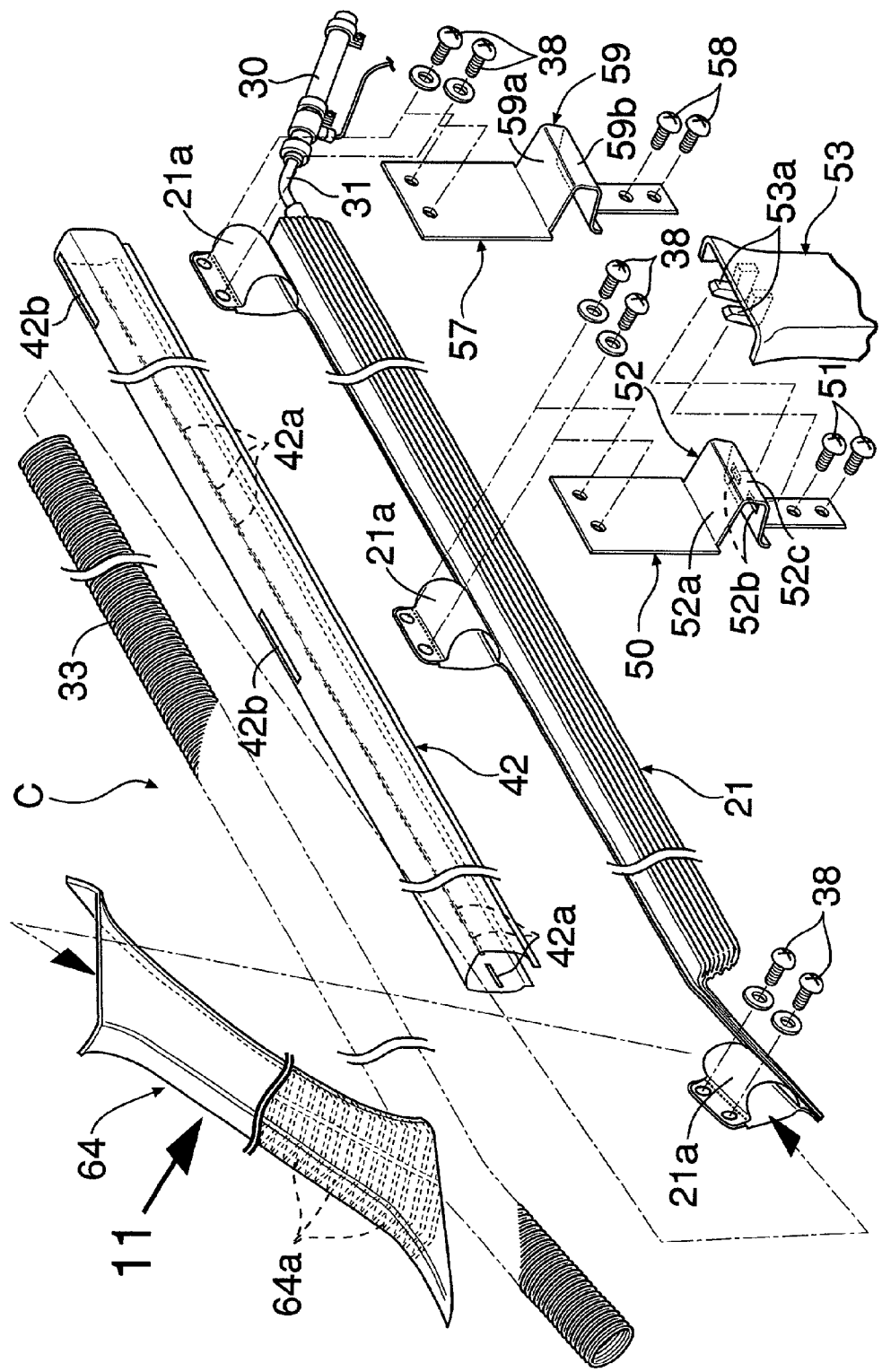

As is clear from FIG. 4, the folded airbag 21 is housed within an airbag cover 42 formed from a nonwoven fabric. The airbag cover 42 is made by sewing along the lower edges of a tube formed from a rectangular piece of cloth, and includes, on the side facing the roof side rail 18, perforation slits 42a that can be ruptured easily. The impact absorbing member supports 21a projecting from the upper end of the airbag 21, pass through openings 42b formed on the upper face of the airbag cover 42 and project upward.

Figure 5:
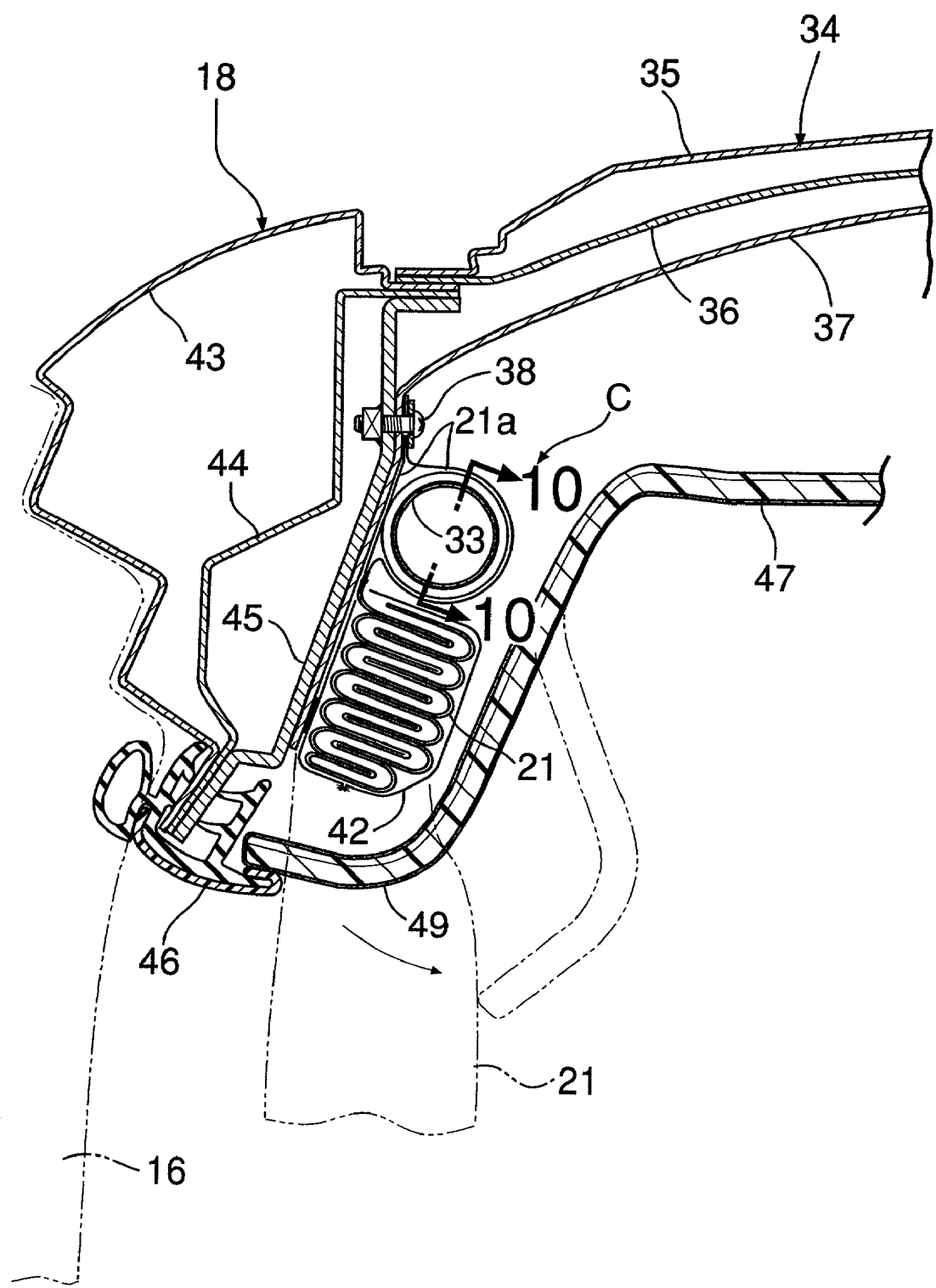

As is clear from FIG. 5, a weather strip 46 that can make contact with the rear door 16 (or the front door 13) is provided on the lower end of the roof side rail 18 formed from an outer member 43, a center member 44, and an inner member 45. The edge of a synthetic resin roof garnish 47 positioned along the lower face of the roof 34 latches on the edge of the weather strip 46 projecting from the lower end of the roof side rail 18 toward the occupant compartment. The occupant-compartment-facing lower face of the roof garnish 47 is covered with a skin material 49, and this skin material 49 is wrapped around the edge of the roof garnish 47 from the lower face side to the upper face side. It is possible thereby to prevent the edge of the synthetic resin roof garnish 47 from splitting and scattering when it is exposed to an impact.

Figure 6:
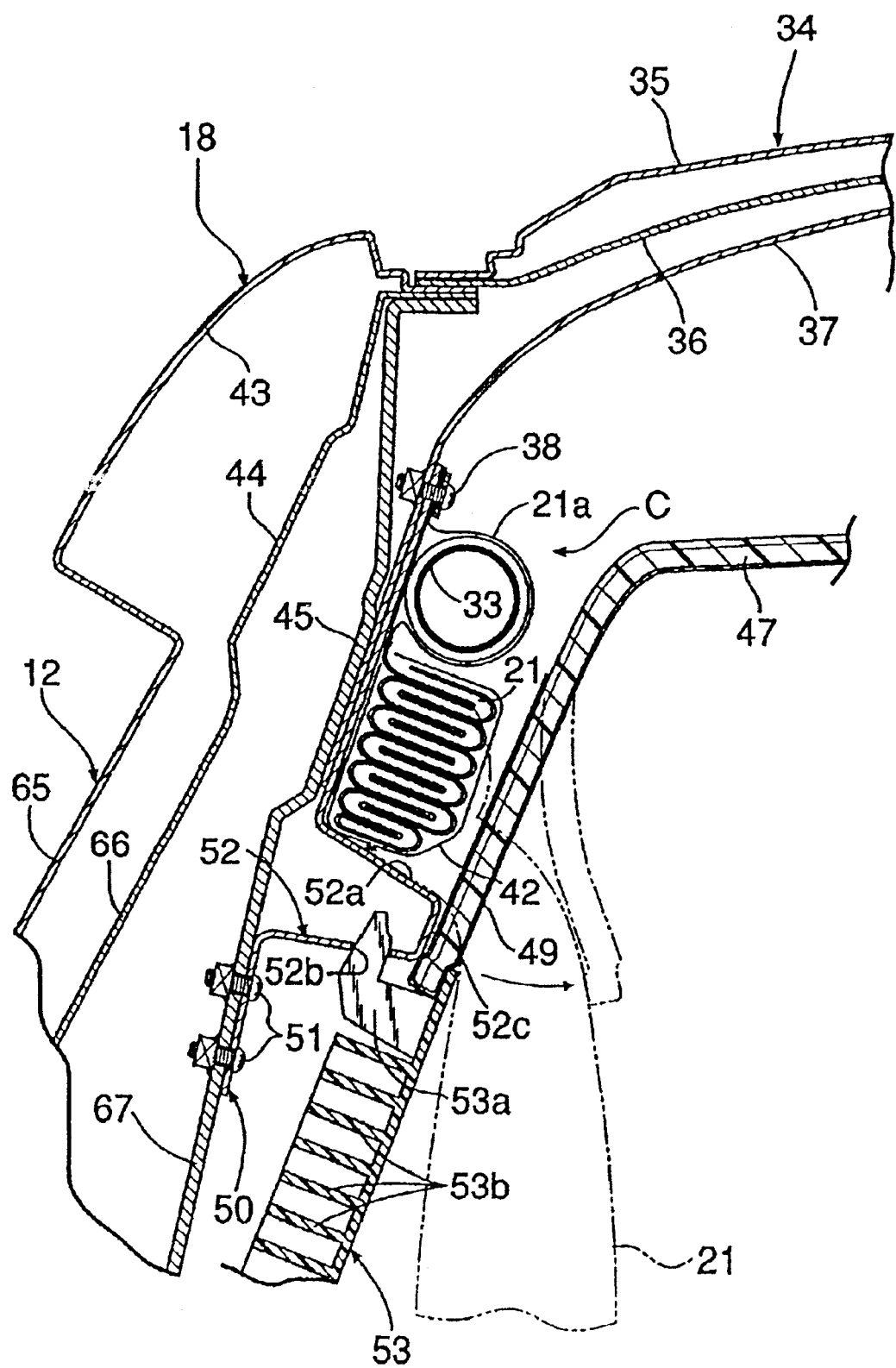

As is clear from FIGS. 4 and 6, the center pillar 12 extending downward from the roof side rail 18 is formed from an outside panel 65, a stiffener 66, and a center pillar inner portion 67. A front bracket 50 is mounted extending from the inner member 37 of the roof 34 to the center pillar inner portion 67 of the center pillar 12. The front bracket 50 is formed by bending a metal sheet; its upper part is superimposed on the impact absorbing member support 21a of the airbag, and fixed together to the inner member 37 of the roof 34 by means of two bolts 38, and its lower part is fixed to the center pillar inner portion 67 of the center pillar 12 by means of two bolts 51.

Formed in the middle section of the front bracket 50 is a projection 52 projecting toward the occupant compartment. A guide surface 52a formed on the upper face of the projection 52 faces the lower end of the folded airbag 21. Latches 53a projectingly provided on the inner face of an upper part of the center pillar garnish 53 engage with two latching holes 52b formed in the lower face of the projection 52. Formed on the inner face of the center pillar garnish 53 are a large number of impact absorbing ribs 53b in order to absorb the impact of a secondary collision to an occupant.

The upper part of the center pillar garnish 53 can thereby be fixed to the center pillar 12 without employing a special clip, etc. and, moreover, the center pillar garnish 53 can be fixed more securely in comparison with the case where a clip is employed. The lower edge of the roof garnish 47 is fixedly interposed between the top face 52c of the projection 52 of the front bracket 50 and the inner face at the upper end of the center pillar garnish 53.

Figure 7:
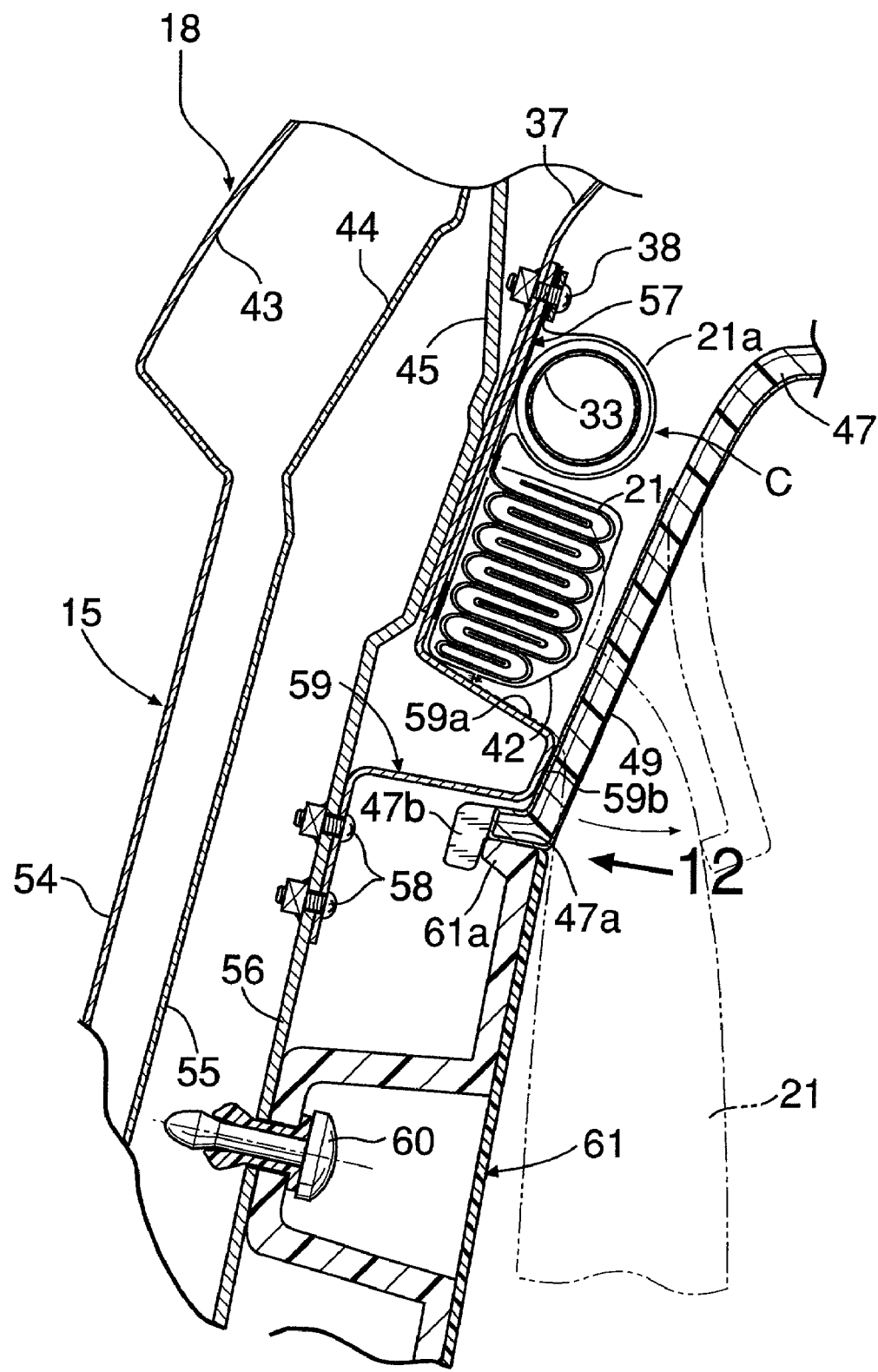
Figure 12:
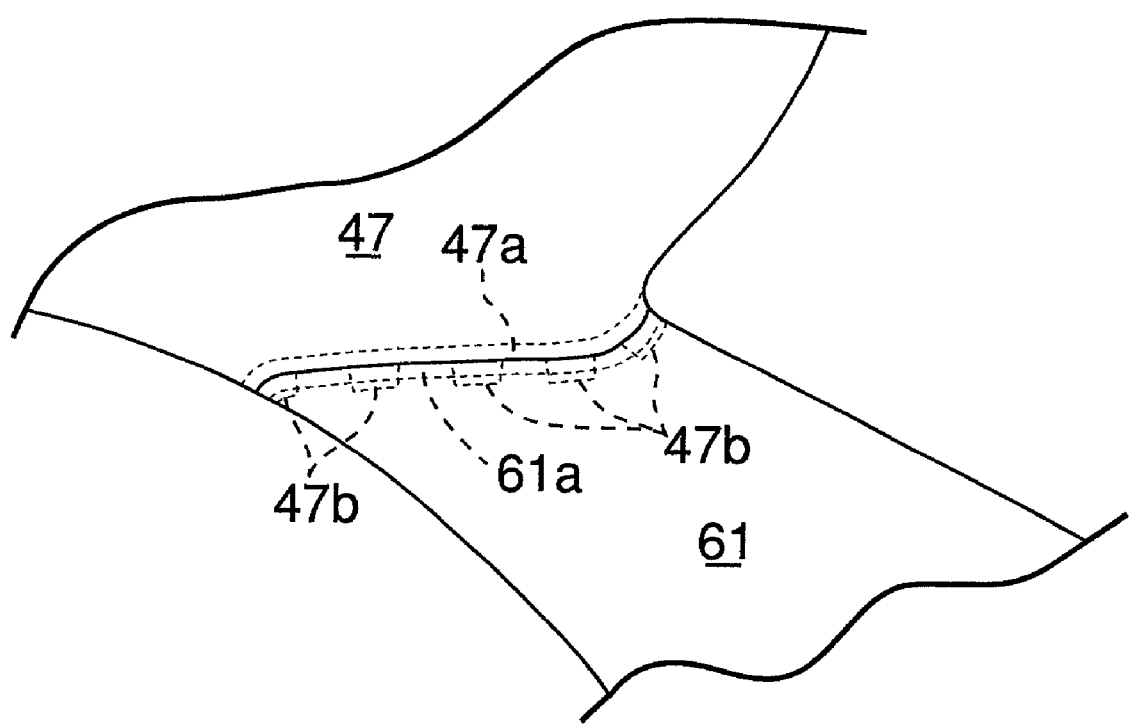

As is clear from FIGS. 4, 7 and 12, the rear pillar 15 extending downward from the roof side rail 18 is formed from an outer member 54, a center member 55, and an inner member 56. A rear bracket 57 is mounted extending from the inner member 37 of the roof 34 to the inner member 56 of the rear pillar 15. The rear bracket 57 has substantially the same shape as that of the front bracket 50; its upper part is superimposed on the impact absorbing member support 21a of the airbag 21, and fixed together to the inner member 37 of the roof 34 by means of two bolts 38, and its lower part is fixed to the inner member 56 of the rear pillar 15 by means of two bolts 58. Formed in the middle section of the rear bracket 57 is a projection 59 projecting toward the occupant compartment. A guide surface 59a formed on the upper face of the projection 59 faces the lower end of the folded airbag 21.

A rear pillar garnish 61 is fixed to the inner member 56 of the rear pillar 15 by means of a clip 60 and has on its upper end a flange 61a bending toward the outside of the vehicle body. Formed on the lower edge of the roof garnish 47 is a flange 47a that abuts against the flange 61a of the rear pillar garnish 61. The flange 47a of the roof garnish 47 has a plurality of (five in the embodiment) latches 47b projecting downward, and these latches 47b engage with the reverse face of the flange 61a of the rear pillar garnish 61. Formed on the inner face of the rear pillar garnish 61 are a large number of impact absorbing ribs (not illustrated) in order to absorb the impact of a secondary collision with an occupant.

Figure 8:
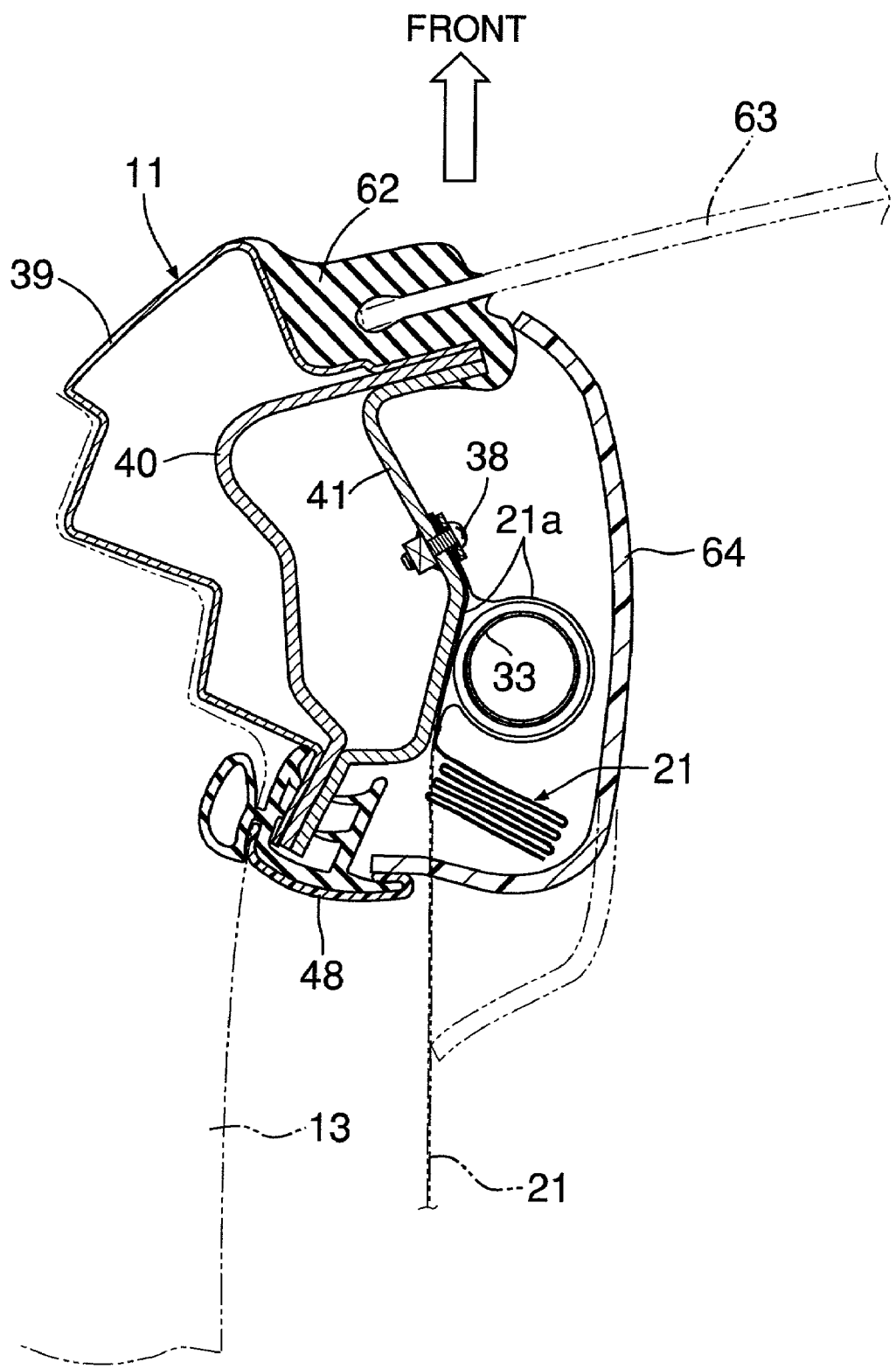
Figure 11:
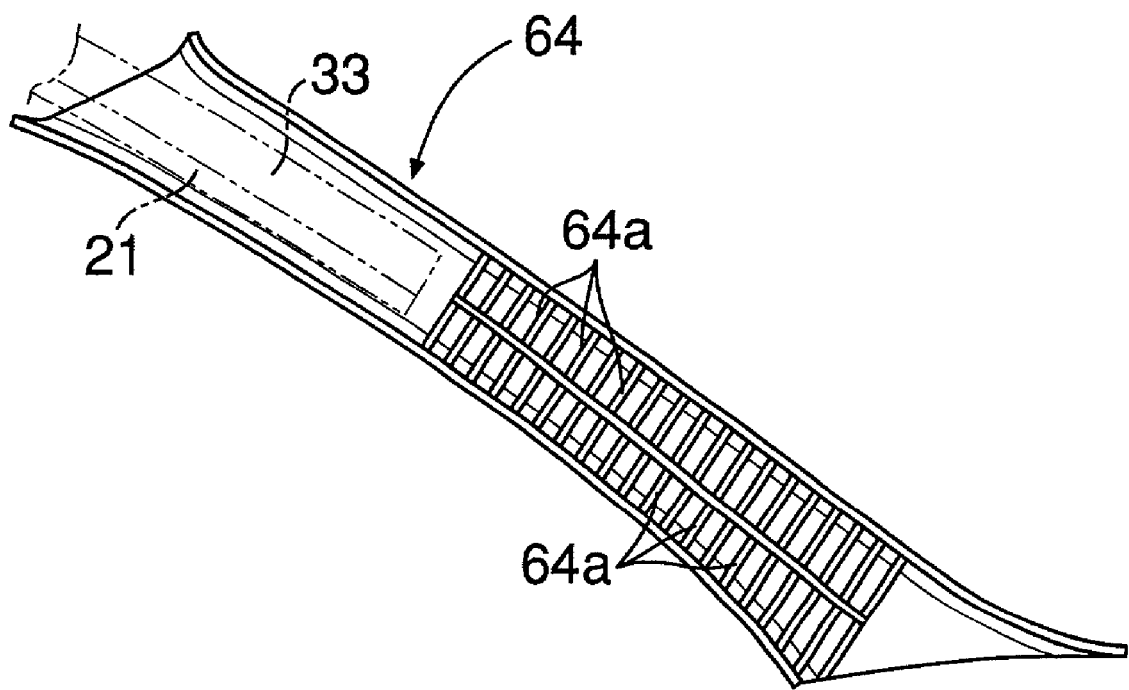

As shown in FIGS. 2, 8 and 11, a side edge of a windshield 63 is supported on the front face of the front pillar 11 via a rubber member 62. A front pillar garnish 64 having an arc-shaped curved cross section is mounted between the rubber member 62 and a weather strip 48 provided on the rear face of the front pillar 11. The upper half of the front pillar garnish 64 is hollow, and the folded non-inflatable part 21b on the front end of the airbag 21 and the front end part of the impact absorbing member 33 are housed therewithin. Integrally formed on the inner face of the lower half of the front pillar garnish 64, which houses neither the airbag 21 nor the impact absorbing member 33, are a large number of impact absorbing ribs 64a for absorbing an impact.

Housing the impact absorbing member 33 within the upper half of the front pillar garnish 64 and forming the large number of impact absorbing ribs 64a in the lower half of the front pillar garnish 64 in this way allows an impact absorbing effect to be exhibited over the whole length of the front pillar 11 while housing the front end part of the airbag 21 within the front pillar 11. Moreover, since no impact absorbing ribs 64a are formed in the upper half of the front pillar garnish 64 housing the front end part of the airbag 21, when the airbag 21 is deployed, the front pillar garnish 64 can be easily flexed, thus enabling the airbag 21 to be smoothly deployed and thereby reliably preventing a part of the front pillar garnish 64 from splitting and scattering.

As is clear from FIG. 13, the tip end of the gas supply pipe 31 extending within the upper communicating passage 29 of the airbag 21 is positioned in the rear of the front end of a wheelhouse 69 of a rear wheel 68 by a distance α. Normal deployment of the airbag 21 may be inhibited when the gas supply pipe 31 is damaged upon a side collision of the vehicle, but since the wheelhouse 69 of the rear wheel 68 is positioned in the vicinity of the wide rear pillar 15 and the tip end of the gas supply pipe 31 is positioned so as not to project beyond the front end of the wheelhouse 69 in order to increase the rigidity of the vehicle body against deformation, the damage to the gas supply pipe 31 can be minimized or effectively prevented upon a side collision. Moreover, since the inflator 30 is housed within the rear pillar 15 which is wider and more rigid than the front pillar 11, the effect of protecting the inflator 30 can also be enhanced.

As shown in FIG. 1, a front side-collision sensor 71 and a rear side-collision sensor 72 are connected to an electronic control unit 73, and when the electronic control unit 73 detects a vehicle side collision (or a vehicle rollover) based on signals from the two acceleration sensors 71 and 72, the electronic control unit 73 outputs an operation signal to the inflator 30 so as to deploy the airbag 21.

Figure 14:
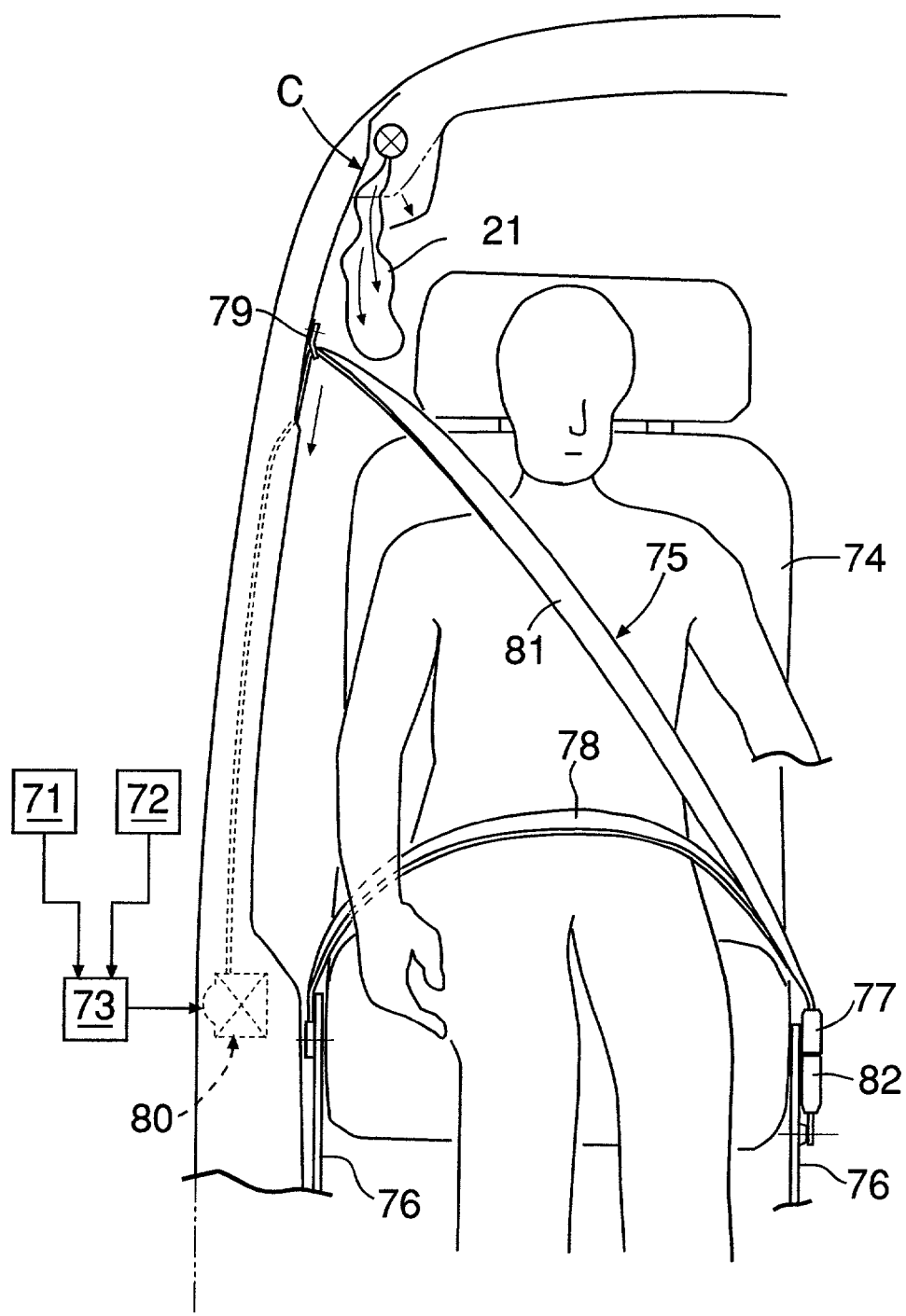

As shown in FIG. 14, a seat belt system 75 for restraining an occupant seated in a front seat 74 includes a lap belt 78 and a shoulder belt 81. One end of the lap belt 78 is fixed to a seat frame 76, and the other end thereof passes slidably through a slit formed in a tongue 77. One end of the shoulder belt 81 is integrally connected to said other end of the lap belt 78, and the other end of the shoulder belt 81 is wound up by a retractor 80 provided in a lower part of the center pillar 12, via a slit guide 79 provided on the center pillar 12. When the tongue 77 is pulled so as to couple it to a buckle 82 fixed to the seat frame 76 in a normal situation, the shoulder belt 81 can be freely drawn out from the retractor 80, but when a front collision sensor (not illustrated) detects a vehicle front collision, the retractor 80 equipped with a known pre-tensioner operates so as to draw in said other end of the shoulder belt 81, thereby reliably restraining the occupant in the front seat 74.

Next, the operation of the above-mentioned embodiment is explained.

When the front side-collision sensor 71 and the rear side-collision sensor 72 detect a vehicle side collision, the inflator 30 operates on an instruction from the electronic control unit 73, and the gas stored under pressure within the inflator 30 flows into the thirteen cells 28 via the gas supply pipe 31 and the upper communicating passage 29, thus inflating the thirteen cells 28. Inflating the airbag 21 ruptures the slits 42a of the airbag cover 42, and the airbag 21 whose restraint has been released deploys downward.

As shown in FIG. 5, in the door openings 14 and 17 of the front door 13 and the rear door 16, the lower edge of the roof garnish 47 is pressed downward due to the pressure of the deploying airbag 21, thus releasing the engagement with the weather strip 46 to form an opening therewith, and the airbag 21 deploys downward within the occupant compartment through the opening so formed.

As shown in FIG. 6, at the position of the center pillar 12, the lower edge of the roof garnish 47 is pressed downward due to the pressure of the deploying airbag 21, thus releasing the engagement with the upper end of the center pillar garnish 53 to form an opening therewith, and the airbag 21 deploys downward within the occupant compartment through the opening so formed.

Since the center pillar garnish 53 covering a side face, on the occupant compartment side, of the center pillar 12 is fixed to the front bracket 50 rather than to the center pillar 12, even when the upper part of the center pillar 12 is deformed relative to the roof side rail 18 because of a vehicle side collision, there is little change in the positional relationship between the center pillar garnish 53 and the airbag 21 supported in the upper part of the front bracket 50. This arrangement, together with secure fixing of the center pillar garnish 53 to the front bracket 50 by means of the latches 53a rather than by a clip, makes it difficult for the deploying airbag 21 to catch on the upper end of the center pillar garnish 53, thereby guaranteeing reliable deployment of the airbag 21.

Moreover, since the deploying airbag 21 is guided obliquely downward toward the occupant compartment along the tilted guide surface 52a of the projection 52 of the front bracket 50, the airbag 21 can be deployed yet more smoothly while avoiding any interference with the center pillar garnish 53.

As shown in FIG. 7, at the position of the rear pillar 15, the lower edge of the roof garnish 47 is pressed downward due to the pressure of the deploying airbag 21, thus releasing the engagement with the upper end of the rear pillar garnish 61 to form an opening therewith, and the airbag 21 deploys downward within the occupant compartment through the opening so formed. In this process, the deploying airbag 21 is guided obliquely downward toward the occupant compartment along the tilted guide surface 59a of the projection 59 of the rear bracket 57. Therefore, the airbag 21 can be deployed smoothly while avoiding any interference with the rear pillar garnish 61.

Furthermore, since the position of the vicinity of the lower edge of the roof garnish 47 is determined by clamping it from opposite sides between the top face 59b of the projection 59 and the flange 61a of the rear pillar garnish 61, the two flanges 47a and 61a abut against each other without forming any step, thereby improving the appearance. Moreover, since the latches 47b of the roof garnish 47 flex and easily disengage from the flange 61a of the rear pillar garnish 61 when the airbag 21 is being deployed, it is possible to reliably form an opening between the roof garnish 47 and the rear pillar garnish 61, through which the airbag 21 is deployed. If the entire lower edge of the roof garnish 47 were engaged with the reverse face of the upper edge of the rear pillar garnish 61, it would become difficult to smoothly separate the lower edge of the roof garnish 47 from the upper edge of the rear pillar garnish 61 when the airbag 21 deploys.

As shown in FIG. 8, at the position of the front pillar 11, the rear edge of the front pillar garnish 64 is pressed downward due to the pressure of the deploying airbag 21, thus releasing the engagement with the weather strip 48 to form an opening therewith, and the airbag 21 deploys downward within the occupant compartment through the opening so formed.

When the acceleration caused by a side collision is equal to or less than a predetermined value, the occupant restraint system C does not operate, but when the impact causes a secondary collision between an occupant and the lower edge of the roof garnish 47 facing the roof side rail 18 or an upper part of the front pillar garnish 64, not only does the corrugated pipe impact absorbing member 33 collapse, thus absorbing the impact, but also the folded airbag 21 exhibits a function of enhancing the impact absorbing effect. In this case, since the impact absorbing member 33 is supported being in contact with the inner member 37 of the roof 34 and the inner member 41 of the front pillar 11 (see FIGS. 5 to 8), the impact absorbing member 33 reliably collapses by pressure from these inner members 37 and 41, thereby effectively absorbing the impact of the secondary collision.

The pre-tensioner of the retractor 80 connected to the electronic control unit 73 operates not only when there is a vehicle front collision but also when a vehicle side collision is detected by the front side-collision sensor 71 and the rear side-collision sensor 72. Accordingly, prior to the airbag 21 deploying when there is a vehicle side collision, the pre-tensioner applies a tension to the lap belt 78 and the shoulder belt 81 of the seat belt system 75, thereby maintaining a correct positional relationship between the shoulder belt 81 and the occupant even in the case where there is interference between the airbag 21 deploying downward and the shoulder belt 81.

In accordance with the present invention described above, when a vehicle is involved in a side collision, tension is applied to a shoulder belt by operation of a pre-tensioner, unlike conventional pre-tensioner systems which operate only when the vehicle is involved in a front collision. It is, therefore, possible to maintain a correct positional relationship between the shoulder belt and an occupant even in the case where there is interference between the shoulder belt and an airbag that is deploying downward from above along the inner face of a side of the occupant compartment.

Although an embodiment of the present invention is explained in detail above, the present invention may be modified in a variety of ways without departing from the spirit and scope of the present invention. For example, the embodiment illustrates the seat belt system 75 for the front seat 74, but the present invention can be applied to a seat belt system for a rear seat.

We claim:

1. An occupant restraint system for a vehicle comprising:
an airbag that is disposed in a folded state along an upper edge of a door opening of a vehicle body;
an inflator for generating a gas when the vehicle is involved in a side collision to inflate the airbag so that it is deployed into a curtain shape along an inner face of a side of an occupant compartment;
a seat belt system for restraining an occupant seated in a seat, the seat belt system comprising a shoulder belt provided below said airbag and a pre-tensioner which is operable to apply tension to the shoulder belt when the vehicle is involved in a front collision;
a side collision sensor and a controller which controls the pre-tensioner to apply the tension to the shoulder belt when said sensor detects that the vehicle is involved in a side collision; and
a gas supply pipe for routing gas from the inflator into the interior of the airbag in the event of a collision;
wherein, prior to the airbag deploying into the occupant compartment when the vehicle is involved in a side collision, the pre-tensioner applies a tension to the shoulder belt in order to maintain a proper positional relationship between the shoulder belt and an occupant, and then the airbag is deployed; and
wherein the airbag comprises a gas communication passage and a pipe support formed from stitching on the airbag, the gas communication passage formed from a part of said stitching so as to extend along the upper edge of the airbag, the gas communication passage having a diameter significantly larger than that of the gas supply pipe and an inlet portion receiving said gas supply pipe therethrough, the pipe support being spaced apart from said inlet portion of said gas communication passage and comprising an upper pipe support portion extending downward from an upper side of the part of the stitching forming the gas communication passage and a lower pipe support portion extending upward from the part of the stitching forming the wall of the gas communication passage so as to clamp the gas supply pipe therebetween, wherein a portion of the gas supply pipe is supported by the pipe support, the airbag includes a plurality of separate inflatable cells, and each of said cells includes an opening in communication with said gas supply pipe in said folded state of the airbag.

2. The occupant restraint system according to claim 1, further comprising a front side collision sensor provided at a front portion of a passenger compartment of the vehicle, a rear side collision sensor provided at a rear portion of the passenger compartment of the vehicle and a controller which controls the pre-tensioner to apply the tension to the shoulder belt when either of said sensors detects that the vehicle is involved in a side collision.

3. The occupant restraint system according to claim 2, wherein said front side collision sensor and said rear side collision sensor are disposed at spaced locations on said vehicle.

4. The occupant restraint system according to claim 1, wherein the tension applied by the pre-tensioner when the vehicle is involved in a side collision is sufficient to maintain a correct positional relationship between the shoulder belt and an occupant even when there is interference between the airbag deploying downward and the shoulder belt.

5. The occupant restraint system according to claim 1, wherein said pre-tensioner applies tension by retracting said shoulder belt when the vehicle is involved in a front collision or a side collision.

6. The occupant restraint system according to claim 1, wherein said airbag extends continuously from a front pillar to a rear pillar of said vehicle.

7. The occupant restraint system according to claim 1, wherein said projection has a guiding surface which is engaged by the airbag that is deployed, said guiding surface is tilted obliquely downward.

8. The occupant restraint system according to claim 1, wherein the upper portion of said center pillar garnish is fixed to said projection with a latch.

9. The occupant restraint system according to claim 8, wherein said latch is formed integrally with said center pillar garnish and is operatively retained in an opening formed in said projection.

10. The occupant restraint system according to claim 8, wherein the latch has a first end fixed to the center pillar garnish, and a second end which is enclosed within an interior space of the projection.

11. The occupant restraint system according to claim 1, wherein the airbag support is disposed above the folded airbag and at least partially surrounds an impact absorbing member, the projection is disposed below the airbag and includes an upper extension which is commonly fixed with the airbag support to the vehicle body using a fastener.

12. The occupant restraint system according to claim 11, wherein the projection further includes a lower extension which is fixed to the vehicle body.

13. The occupant restraint system according to claim 1, wherein the airbag support retains an impact absorbing member adjacent to the vehicle body at a position above the airbag.

14. The occupant restraint system according to claim 1, wherein the occupant restraint system further comprises a retractor, and wherein prior to the airbag deploying into the occupant compartment when the vehicle is involved in a side collision, the pre-tensioner applies a tension to the shoulder belt by retracting a portion of the shoulder belt into the retractor.

15. The occupant restraint system according to claim 1, wherein the occupant restraint system further comprises a retractor, and wherein when said sensor detects that the vehicle is involved in a collision and prior to the airbag deploying into the occupant compartment, the pre-tensioner applies a tension to the shoulder belt by retracting a portion of the shoulder belt into the retractor.

16. The occupant restraint system according to claim 1, wherein the projection is disposed below the airbag and includes upper and lower extensions which are fixed to the vehicle body.

17. The occupant restraint system according to claim 1, further including a fastener which commonly fixes the airbag support and the projection to the vehicle body.

* * * * *